United States Patent
Liu et al.

(10) Patent No.: US 11,148,721 B2
(45) Date of Patent: Oct. 19, 2021

(54) VEHICLE BODY STRUCTURE AND VEHICLE

(71) Applicant: BYD COMPANY LIMITED, Guangdong (CN)

(72) Inventors: Xinchun Liu, Shenzhen (CN); Yanbing Yang, Shenzhen (CN); Feng Yang, Shenzhen (CN); Bengang Yi, Shenzhen (CN); Boqun Niu, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 150 days.

(21) Appl. No.: 16/627,615

(22) PCT Filed: Jun. 28, 2018

(86) PCT No.: PCT/CN2018/093443
§ 371 (c)(1),
(2) Date: Dec. 30, 2019

(87) PCT Pub. No.: WO2019/001534
PCT Pub. Date: Jan. 3, 2019

(65) Prior Publication Data
US 2020/0140016 A1    May 7, 2020

(30) Foreign Application Priority Data

Jun. 30, 2017  (CN) .......................... 201710525916.2

(51) Int. Cl.
*B62D 21/15* (2006.01)
*B60K 1/04* (2019.01)
(Continued)

(52) U.S. Cl.
CPC .............. *B62D 21/152* (2013.01); *B60K 1/04* (2013.01); *B60N 2/005* (2013.01); *B62D 21/03* (2013.01);
(Continued)

(58) Field of Classification Search
CPC ...... B62D 21/152; B62D 21/03; B62D 21/08; B62D 21/09; B62D 21/155; B62D 25/08;
(Continued)

(56) References Cited

U.S. PATENT DOCUMENTS

| | | | |
|---|---|---|---|
| 9,016,424 B2* | 4/2015 | Awano | B62D 25/082 180/274 |
| 9,637,075 B2* | 5/2017 | Atsumi | B60R 19/023 |
| 9,758,192 B2* | 9/2017 | Hamdoon | B62D 21/157 |
| 9,981,698 B2* | 5/2018 | Maier | B62D 25/20 |

(Continued)

FOREIGN PATENT DOCUMENTS

| | | |
|---|---|---|
| CN | 2913069 Y | 6/2007 |
| CN | 101565057 A | 10/2009 |

(Continued)

OTHER PUBLICATIONS

English Translation of International Search Report from PCT/CN2018/093443 dated Sep. 14, 2018 (2 pages).

*Primary Examiner* — Pinel E Romain
(74) *Attorney, Agent, or Firm* — Calfee, Halter & Griswold LLP (57) ABSTRACT

A vehicle body structure includes a forecabin crossbeam and two front longitudinal beams disposed at intervals along a left-right direction. The forecabin crossbeam and the two front longitudinal beams are integrally formed and are at least partially located at the bottom of the front longitudinal beam.

20 Claims, 5 Drawing Sheets

(51) Int. Cl.
*B60N 2/005* (2006.01)
*B62D 21/03* (2006.01)
*B62D 21/08* (2006.01)
*B62D 21/09* (2006.01)
*B62D 25/08* (2006.01)
*B62D 25/20* (2006.01)

(52) U.S. Cl.
CPC .............. *B62D 21/08* (2013.01); *B62D 21/09* (2013.01); *B62D 21/155* (2013.01); *B62D 25/08* (2013.01); *B62D 25/20* (2013.01); *B60K 2001/0438* (2013.01)

(58) Field of Classification Search
CPC .......... B62D 25/20; B62D 25/2045; B62D 25/2018; B60K 1/04; B60K 2001/0438; B60N 2/005; B60Y 2306/01
USPC ....................................................... 296/187.08
See application file for complete search history.

(56) References Cited

U.S. PATENT DOCUMENTS

| | | | |
|---|---|---|---|
| 10,124,834 B2* | 11/2018 | Saeki | B62D 25/2036 |
| 10,661,832 B2* | 5/2020 | Maier | B62D 29/008 |
| 2016/0068196 A1* | 3/2016 | Saeki | B62D 21/157 |
| | | | 296/187.08 |
| 2016/0368535 A1 | 12/2016 | Kim | |
| 2020/0140018 A1* | 5/2020 | Grottke | B62D 27/065 |

FOREIGN PATENT DOCUMENTS

| | | |
|---|---|---|
| CN | 202089121 U | 12/2011 |
| CN | 102781765 A | 11/2012 |
| CN | 103569210 A | 2/2014 |
| CN | 203666780 U | 6/2014 |
| CN | 204415522 U | 6/2015 |
| CN | 105329320 A | 2/2016 |
| CN | 106132811 A | 11/2016 |
| CN | 106476893 A | 3/2017 |
| CN | 206125173 U | 4/2017 |
| FR | 2989322 A1 | 10/2013 |

* cited by examiner

VEHICLE BODY STRUCTURE AND VEHICLE

CROSS-REFERENCE TO RELATED APPLICATIONS

This application is based on International Application No. PCT/CN2018/093443, filed on Jun. 28, 2018, which claims priority to and benefits of Chinese Patent Application No. 201710525916.2, filed with the State Intellectual Property Office of P. R. China on Jun. 30, 2017. The entire content of the above-referenced application is incorporated herein by reference.

FIELD

The present disclosure relates to the field of vehicles, and in particular, to a vehicle body structure and a vehicle.

BACKGROUND

To minimize mortality and injury severity of passengers in a traffic (collision) accident of a vehicle (particularly, a passenger vehicle) is a core design technology of vehicle development and production. The design of a collision safety deformation structure is the basis for improving the collision safety performance of vehicles. To meet the increasingly high requirement of the public on the collision safety of family passenger vehicles, in recent years, related departments of countries continuously and gradually improve and add some test conditions of the collision safety performance of passenger vehicles in domestic related regulations and evaluation criteria. For example, the United States has updated a series of regulations and evaluation criteria related to the collision safety performance for vehicles sold in the domestic market, which requires the passenger compartment of the vehicle body to bear a larger collision force and have a smaller deformation under more working conditions.

As the family passenger vehicles are widespread in the global market, environmental protection problems caused by the shortage and burning of fossil energy are increasingly severe. Therefore, countries are actively developing new energy vehicles. Electric vehicles are becoming a future trend as a direction of the new energy vehicles. In addition to meeting the conventional design, designing a longer endurance mileage for the electric vehicles needs to be taken into consideration, to contend with the conventional fuel vehicles.

In addition, with the rapid development of electric vehicles in recent years, to improve the endurance mileage, more energy storage batteries need to be equipped on an electric vehicle. In this way, compared with a fuel vehicle with a same specification, the weight of the electric vehicle is greatly increased, so that under a same test condition, kinetic energy of the vehicle in an early stage of a collision is increased. That is, a vehicle body structure of the electric vehicle needs to bear larger forces and absorb more kinetic energy to improve the safety. Further, because a storage battery pack needs to be disposed in the electric vehicle, much space under the vehicle body is occupied, and various classic vehicle body collision safety technologies of the conventional fuel vehicles cannot be used. Therefore, a new vehicle body structure technology that can meet the storage battery deployment and the vehicle safety needs to be designed.

SUMMARY

The present disclosure is to at least resolve one of the technical problems in the prior art. The present disclosure provides a vehicle body structure with higher strength.

The present disclosure further provides a vehicle including the foregoing vehicle body structure.

A vehicle body structure according to an embodiment of a first aspect of the present disclosure includes a forecabin crossbeam; and two front longitudinal beams disposed at intervals along a left-right direction, where the forecabin crossbeam is integrally formed with the two front longitudinal beams and is at least partially located at the bottom of the front longitudinal beam.

The vehicle body structure according to the embodiment of the present disclosure can effectively improve the strength and stability of the vehicle body structure during a front collision, so that the safety performance of the vehicle is increased.

A vehicle according to an embodiment of a second aspect of the present disclosure includes the foregoing vehicle body structure according to the embodiment of the first aspect of the present disclosure.

Additional aspects and advantages of the present disclosure will be partially given in the following descriptions, and other parts will become apparent in the following descriptions or may be learned from the practice of the present disclosure.

BRIEF DESCRIPTION OF THE DRAWINGS

The foregoing and/or additional aspects and advantages of the present disclosure will become apparent and easy to be understood in the descriptions of embodiments with reference to the following drawings.

DETAILED DESCRIPTION

The following describes embodiments of the present disclosure in detail. Examples of the embodiments are shown in the accompanying drawings. The same or similar elements and the elements having same or similar functions are denoted by same or similar reference numerals throughout the descriptions. The embodiments described below with reference to the accompanying drawings are exemplary and merely used to explain the present disclosure, but cannot be understood as a limitation to the present disclosure.

In the present disclosure, unless otherwise specified, location words used such as "up, down, left, right, front, and rear" are defined on the basis of an up-down direction, a left-right direction, and a front-rear direction of a vehicle. Specifically, in the drawings, an X direction is a front-rear direction of the vehicle, that is, a longitudinal direction of the vehicle, where one side pointed by an arrow is "front", and the opposite is "rear"; a Y direction is a left-right direction of the vehicle, that is, a horizontal direction of the vehicle, where one side pointed by an arrow is "right", and the opposite is "left"; and a Z direction is an up-down direction of the vehicle, and that is, the height direction of the vehicle, where one side pointed by an arrow is "up", and the opposite is "down". "Inner and outer" are defined on the basis of contours of corresponding components. For example, in-vehicle and out-vehicle are defined on the basis of a contour of a vehicle, where one side close to the middle of the vehicle is "inner", and the opposite is "outer". The foregoing definitions are merely used to help describe the present disclosure, and should not be understood as a limitation to the present disclosure.

All "crossbeams" in the present disclosure refer to beams generally extending along the left-right direction of the vehicle, and all "longitudinal beams" refer to beams generally extending along the front-rear direction of the vehicle. In addition, unless otherwise specified, meanings of nouns such as "dash board", "floor panel", "sill inner plate", "front anti-collision crossbeam", and "rear anti-collision crossbeam" involved in the implementations of the present disclosure are meanings known in the art.

The present disclosure provides a vehicle body structure. As shown in FIG. 1 to FIG. 5, the vehicle body structure may include two front longitudinal beams 100 disposed at intervals along a left-right direction, a front crossbeam 210, and a floor panel 300. The front crossbeam 210 is integrally formed with the two front longitudinal beams 100. A front end of the front longitudinal beam 210 may be connected to a front anti-collision crossbeam or be integrally formed with a front anti-collision crossbeam.

A dash board 320 is connected to a front end of the floor panel 300, and the passenger compartment of the vehicle is limited in the rear of the dash board 320 and in the above of the floor panel 300.

In an implementation, the front crossbeam 210 is fixed on a lower surface of the floor panel 300 and a rear end of the front longitudinal beam 100 extends to the front crossbeam 210. That is, the front longitudinal beam 100 ends at the front crossbeam 210, so as to form a support for the rear end of the front longitudinal beam 100 when a front collision occurs to the vehicle, to disperse the collision impact transferred by the front longitudinal beam 100, to prevent the rear end of the front longitudinal beam 100 from deforming and intruding into the passenger compartment. The front crossbeam 210 may be disposed close to the dash board 320. In addition, the front crossbeam 210 is fixedly connected to the lower surface of the floor panel 300, to provide a function of enhancing the floor panel 300, to prevent the passenger compartment space from being squeezed due to the excessive deformation and folding of the floor panel 300 in the collision (including a front collision and a side collision). In some following implementations, when the front crossbeam 210 is formed as a battery pack front mounting crossbeam used for mounting a battery pack, the front crossbeam 210 is disposed in front of the battery pack, so as to absorb impact energy, reduce squeezing of the collision impact on the battery pack, and protect the battery pack. Certainly, in other implementations, the front crossbeam 210 may also be located in a forecabin according to a design requirement.

A strengthening structure (for example, a strengthening rib, a strengthening rib plate, or a strengthening plate) may be integrally formed inside the front crossbeam 210, to further increase the capability of the front crossbeam 210 for bearing the collision, and decrease deformations of the front crossbeam 210 in the collision.

As shown in FIG. 1 to FIG. 5, a forecabin crossbeam 220 may be further formed between the two front longitudinal beams 100, and the forecabin crossbeam 220 is integrally formed with the two front longitudinal beams 100. The forecabin crossbeam 220 is disposed in front of the dash board 320 and may be connected to the dash board 320, to stop the front elements of the vehicle from moving backward, and further to provide a function of strengthening the dash board 320, so that the dash board 320 is not easily deformed by the collision. In addition, the forecabin crossbeam 220, the two front longitudinal beams 100, and the front crossbeam 210 can encircle a closed-loop frame structure, so that this part of the vehicle body structure has higher strength, and can bear a larger initial collision load and backward impact of the front elements of the vehicle, and the front deformation of the vehicle can be reduced by using the forecabin crossbeam 220 and the front crossbeam 210 to transfer the force, to protect passengers and vehicle elements such as the battery pack disposed behind the front crossbeam 210.

By making the forecabin crossbeam 220 and the front longitudinal beam 100 integrally formed, the bonding strength of the forecabin crossbeam 220 and the front longitudinal beam 100 can be improved. Therefore, it is ensured that the forecabin crossbeam 220 can better bear the collision of a power device (such as a motor or an engine) of the vehicle.

The front longitudinal beam 100 encloses along a front wheel to form a concave portion to avoid the front wheel. To prevent the front longitudinal beam 100 from being bent at the concave portion when a front collision occurs to the vehicle and intruding into the dash board 320 or squeezing other elements located in the front of the vehicle, the forecabin crossbeam 220 may be formed at the concave portion of the front longitudinal beam 100, to form a support for the front longitudinal beam 100 and prevent the front longitudinal beam 100 from being bent.

In an implementation, a distance by which orthographic projections of the front end of the front longitudinal beam 100 and the rear end of the front longitudinal beam 100 on a horizontal plane are staggered in a left-right direction is not greater than 80 mm. That is, a distance by which orthographic projections of the front end of the front longitudinal beam 100 along a Z direction and the rear end of the front longitudinal beam 100 along the Z direction on a horizontal plane are staggered along a Y direction is not greater than 80 mm, so that the front longitudinal beam 100 is close to a straight beam as much as possible, thereby achieving a better force transfer effect.

As shown in FIG. 2 to FIG. 5, the front longitudinal beam 100 may include a main body segment 100A and a downward bending segment 100B formed at a rear end of the main body segment 100A. The forecabin crossbeam 220 is formed on the downward bending segments 100B of the two front longitudinal beams 100 and is at least partially located below the main body segment 100A. Generally, the main body segment 100A of the front longitudinal beam is higher than the position of the floor panel 300 of the passenger compartment of the vehicle, and the transition of the front longitudinal beam in an up-down direction is implemented by using the downward bending segment. The higher main body segment 100A may be used in a power device such as a motor or an engine of the vehicle. Generally, the power device of the vehicle is at least partially located below the main body segment 100A.

In this way, when a front collision occurs, the front longitudinal beam 100 crumples to drive the vehicle elements mounted on the main body segment 100A to move backward, and because the forecabin crossbeam 220 mounted on the downward bending segment 100B is partially located below the main body segment 100A, the vehicle elements moving backward, such as the power device of the vehicle like a motor, can be stopped, to prevent the vehicle elements from intruding into the vehicle cabin due to the collision, thereby protecting the passengers.

Specifically, a mounting point used for mounting a subframe is disposed on the main body segment 100A, and the power device of the vehicle is mounted on the main body segment 100A through the subframe and is at least partially disposed below the main body segment 100A and in front of the forecabin crossbeam 220, so that the forecabin crossbeam 220 can prevent the power device from moving backward and threatening the passenger compartment when the front collision occurs. To ensure that the forecabin crossbeam 220 is below the main body segment 100A, the forecabin crossbeam 220 is at least partially located at the bottom of the downward bending segment 100B.

A sill inner plate 500 is disposed on left and right sides of the floor panel 300. A front end of the sill inner plate 500 may extend forward out of the front crossbeam 210, and a distance between the front end of the sill inner plate 500 and the front crossbeam 210 along a front-rear direction may be less than 1000 mm, for example, may be 30 to 200 mm, and specifically, may be 60 to 140 mm. The sill inner plate 500 may be integrally formed with the front crossbeam 210.

To disperse the collision impact backward, the vehicle body structure may further include two vehicle body longitudinal beams 110 disposed at intervals along a left-right direction. The vehicle body longitudinal beam 110 may be integrally formed with the front crossbeam 210 and extends backward from the front crossbeam 210, to transfer the collision impact generated by the front collision to the rear portion of the vehicle body structure, thereby reducing the deformation of the front portion of the vehicle. A rear end of the vehicle body longitudinal beam 110 may be connected to a rear anti-collision crossbeam or be integrally formed with a rear anti-collision crossbeam. In this way, the collision impact generated by the rear collision may further be transferred to the front portion of the vehicle body structure, to reduce the deformation of the rear portion of the vehicle body. A front end of the vehicle body longitudinal beam 110 and the rear end of the front longitudinal beam 100 may be staggered in the left-right direction. That is, relative to the vehicle body longitudinal beam 110, the front longitudinal beam 100 is closer to a longitudinal central line of the vehicle.

Because the collision impact is mainly focused on a rear segment of the front longitudinal beam 100, and is then dispersed to the rear portion of the vehicle through other vehicle body structures, the rear segment of the front longitudinal beam 100 needs to have sufficient strength, to ensure good transfer of the collision impact and prevent the rear segment of the front longitudinal beam 100 from squeezing the dash board 320 due to deformation. Therefore, as shown in FIG. 4 and FIG. 5, in an implementation, the vehicle body structure may further include an inner connecting plate 410 and an outer connecting plate 420 or one of them, to provide a function of strengthening and straightening the rear segment of the front longitudinal beam 100.

Specifically, the inner connecting plate 410 is disposed on an inner side of the front longitudinal beam 100 and is located between the forecabin crossbeam 220 and the front crossbeam 210, and the inner connecting plate 410 may be integrally formed with the front longitudinal beam 100, the forecabin crossbeam 220, and the front crossbeam 210. In this way, the inner connecting plate 410 can help disperse the collision impact, to prevent the rear segment of the front longitudinal beam 100 from causing the dash board 320 to deform and squeezing the passenger compartment space due to excessive bending.

Figure 4:
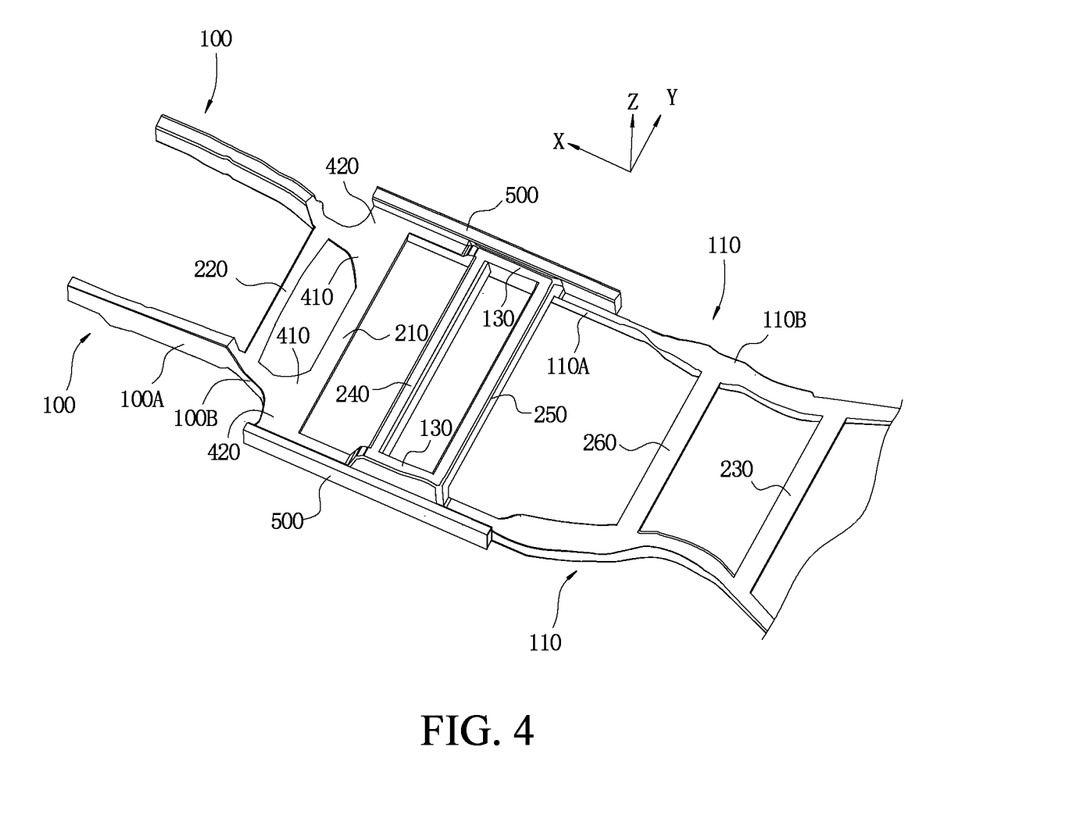
FIG. 4 is a three-dimensional top view of another vehicle body structure according to the present disclosure.
Figure 5:
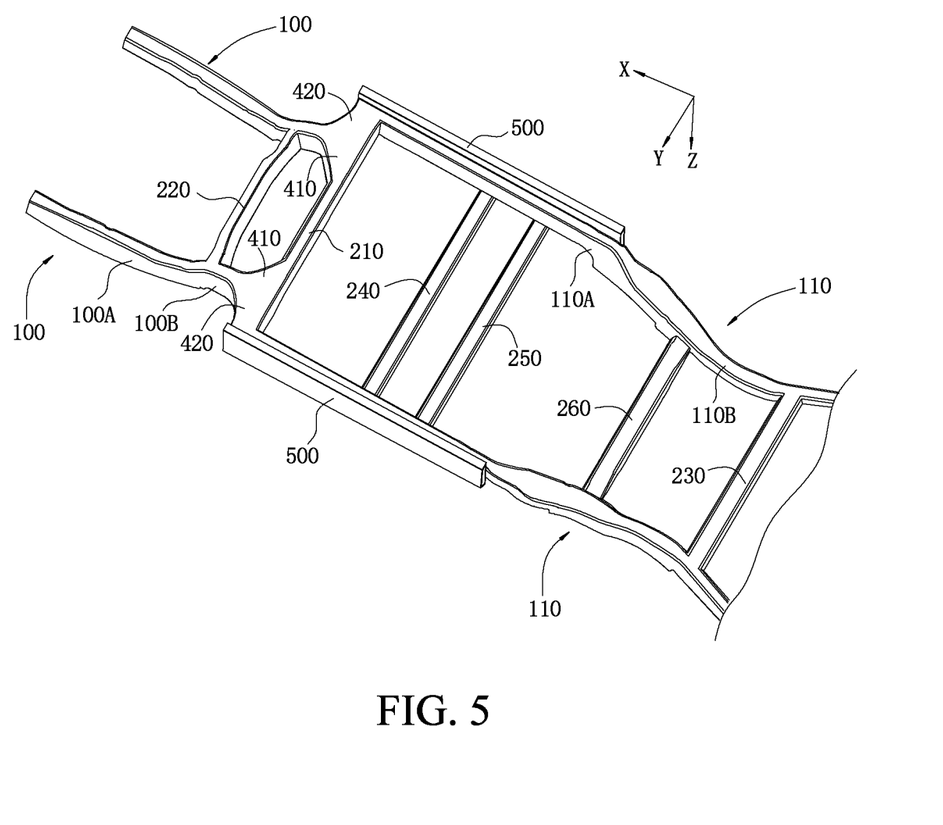
FIG. 5 is a three-dimensional bottom view of another vehicle body structure according to the present disclosure.

As shown in FIG. 4 and FIG. 5, the outer connecting plate 420 is disposed on an outer side of the front longitudinal beam 100 and is integrally formed with the front longitudinal beam 100 and the front crossbeam 210, to provide a function of strengthening the front longitudinal beam 100, and may further be applied to a situation of a little offset collision of the vehicle. That is, when the collision occurs at the outer side of the front longitudinal beam 100, the front longitudinal beam 100 bears relatively small stress and has a relatively poor effect of crumpling and energy absorbing, and the wheel bears the collision and falls back to press an A-pillar of the vehicle and the dash board 320, easily causing the vehicle body structure to deform and squeeze the passenger compartment.

Because the outer connecting plate 420 is located on the outer side of the front longitudinal beam 100 and is respectively integrally formed with the front longitudinal beam 100 and the front crossbeam 210, in the little offset collision of the front collision, the outer connecting plate 420 can bear the collision of the wheel and transfer the force to the front longitudinal beam 100 and the front crossbeam 210. Further, the outer connecting plate 420 may extend outward to be integrally formed with the sill inner plate 500, so that the acting force of the little offset collision can further be transferred to the rear portion of the vehicle through the sill inner plate 500, to reduce the deformation of the A-pillar of the vehicle and the dash board 320 caused by the collision impact. When a front collision occurs to the vehicle, and the front longitudinal beam 100 bears a relatively large stress, the collision impact can further be dispersed and transferred by using the outer connecting plate 420, to prevent the rear segment of front longitudinal beam 100 from intruding into the dash board 320 of the vehicle due to the bending and deformation.

In an implementation, the vehicle body longitudinal beam 110 may be integrally formed with the sill inner plate 500. The length of the vehicle body longitudinal beam 110 may be greater than that of the sill inner plate 500. The vehicle body longitudinal beam 110 may include a front segment 110A of the vehicle body longitudinal beam and a rear segment 110B of the vehicle body longitudinal beam that are integrally formed. The position of the front segment 110A of the vehicle body longitudinal beam generally corresponds to that of the sill inner plate 500 and the front segment 110A of the vehicle body longitudinal beam and the sill inner plate 500 are integrally formed. The front end 110A of the vehicle body longitudinal beam may form a straight beam. The rear segment 110B of the vehicle body longitudinal beam extends backward out of the sill inner plate 500, and may form an arched beam concaving inward to avoid the rear wheel.

In an implementation, the vehicle body structure may further include a rear-floor crossbeam 230, and the rear-floor crossbeam 230 is disposed behind the front crossbeam 210 at intervals and is connected to the lower surface of the floor panel 300. The rear-floor crossbeam 230 may be integrally formed with rear segments 110B of the two vehicle body longitudinal beams. A rear end of the rear segment 110B of the vehicle body longitudinal beam extends backward out of the rear-floor crossbeam 230.

In this case, the front crossbeam 210, the two vehicle body longitudinal beams 110, and the rear-floor crossbeam 230 jointly encircle a bearing frame. The bearing frame may be used for mounting and bearing the vehicle elements, such as a battery tray used for mounting and bearing the battery pack. Batteries can be disposed below the floor panel 300 as much as possible by using the structure design of the bearing frame, thereby facilitating to ensure that the vehicle has an endurance distance as long as possible.

When the bearing frame is used for mounting the bearing tray, the front crossbeam 210, the rear-floor crossbeam 230, and the vehicle body longitudinal beam 110 may be sequentially referred to as a battery pack front mounting crossbeam, a battery pack rear mounting crossbeam, and a battery pack mounting longitudinal beam. A battery tray fastening hole may be opened on the front crossbeam 210, the rear-floor crossbeam 230, and the vehicle body longitudinal beam 110, to mount the battery tray for bearing the battery pack on the front crossbeam 210, the rear-floor crossbeam 230, and the vehicle body longitudinal beam 110 through a fastener.

The vehicle body longitudinal beam 110 is fixedly connected to the lower surface of the floor panel 300 and is integrally formed with the sill inner plate 500, so that a vehicle body beam is respectively mounted on the floor panel 300 in the left-right direction and the front-rear direction of the vehicle, to provide a function of strengthening the floor panel 300, and avoid an excessive deformation of the floor panel 300 in the collision (including a front collision and a side collision).

When a front collision occurs to the vehicle, an end portion of the vehicle body longitudinal beam 110 can abut against the front crossbeam 210, to prevent the vehicle body longitudinal beam 210 from moving backward and squeezing other elements of the vehicle body structure. For example, when the front crossbeam 210 is used as the battery pack front mounting crossbeam, the battery pack located behind the battery pack front mounting crossbeam can be protected in the connection manner. Similarly, when a side collision occurs to the vehicle, the front crossbeam 210 can abut against the sill inner plate 500, to prevent the sill inner plate 500 from squeezing inward to drive the vehicle body longitudinal beam 110 to move toward the inner side of the vehicle body structure, to protect other elements located on the inner side of the vehicle body longitudinal beam 110. For example, when the vehicle body longitudinal beam 110 is used as the battery pack mounting longitudinal beam, the battery pack located at the inner side of the battery pack mounting longitudinal beam can be protected in the connection manner, thereby avoiding a potential outbreak of a fire of the battery pack caused by squeezing and deformation, and improving the collision safety performance of the vehicle.

When a front collision occurs to the vehicle, the collision impact is mainly focused on the rear end of the front longitudinal beam 100 and is dispersed to the vehicle body structures (for example, the sill inner plate 500, the vehicle body longitudinal beam 110, or the like) located on two sides of the vehicle body structure through the front crossbeam 210.

In this case, a force transfer path of the vehicle body structure during the front collision may be: the front longitudinal beam 100—the front crossbeam 210—the vehicle body longitudinal beam 110 and the sill inner plate 500. A force transfer path during the rear collision is opposite to that during the front collision.

The bearing frame involved in the present disclosure can become a part of the force transfer path during the collision of the vehicle body structure through some of the foregoing implementations. Specifically, the rear end of the front longitudinal beam 100 and the front crossbeam 210 of the bearing frame are integrally formed. When a front collision occurs to the vehicle, the front longitudinal beam 100 first bears the impact, and the collision impact is transferred from the rear end of the front longitudinal beam 100 to the front crossbeam 210 and is dispersed to the vehicle body structure at the rear portion of the vehicle along the vehicle body longitudinal beam 110 and the sill inner plate 500, so that the vehicle can absorb the collision energy as a whole, and the deformation of the dash board 320 of the vehicle is reduced, thereby protecting the driver and passengers in the passenger compartment. In addition, the strength of the bearing frame can be increased because the front crossbeam 210, the sill inner plate 500, and the vehicle body longitudinal beam 110 are connected, and the collision (including a front collision, a rear collision, and a side collision) deformation degree of the bearing frame is reduced, thereby avoiding a potential outbreak of a fire of the battery pack caused by squeezing due to the deformation of the bearing frame.

The vehicle body structure may further include a back seat mounting crossbeam 260. The back seat mounting crossbeam 260 may be integrally formed with the vehicle body longitudinal beam 110 and located in front of the rear-floor crossbeam 230 at intervals. The bearing frame may further include the back seat mounting crossbeam 260, so that the quantity of the mounting points of the battery tray and the bearing frame can be increased, which facilitates to maintain the mounting stability of the battery pack. In addition, when the bearing frame involved in the present disclosure is used as a part of the force transfer path of the vehicle body structure, the back seat mounting crossbeam 260 can further increase a force transfer path between the rear longitudinal beams 120.

Figure 2:
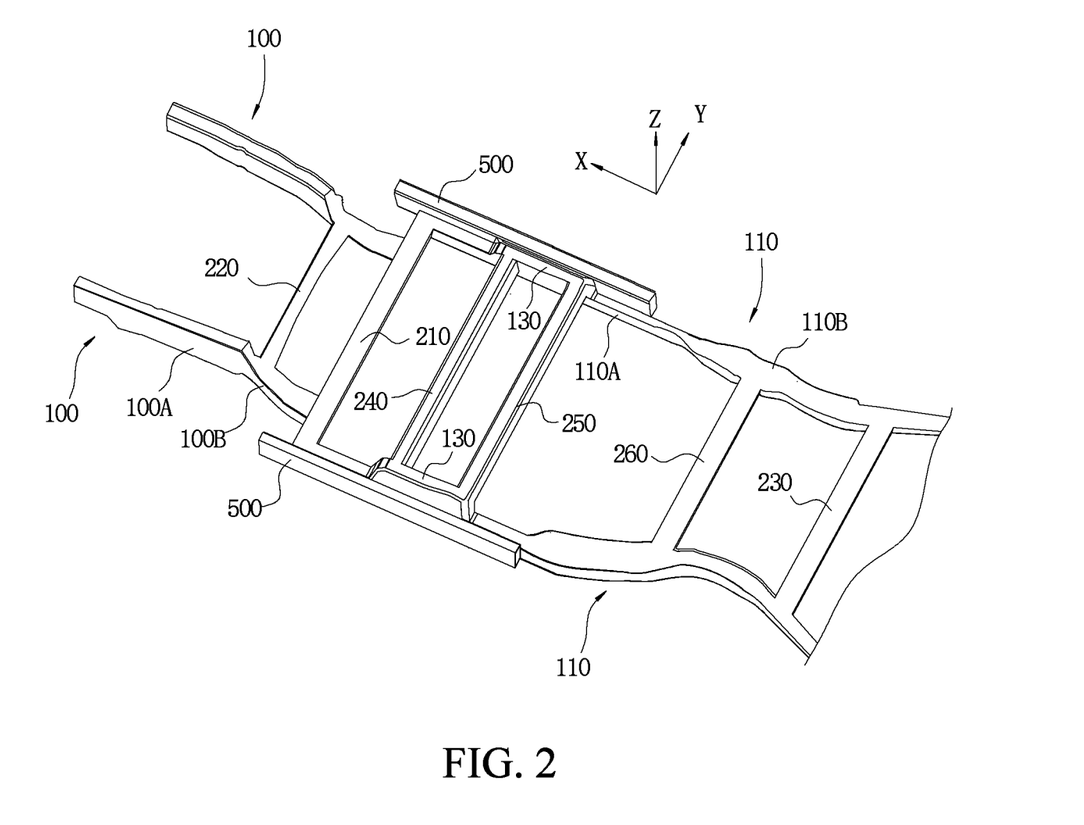
FIG. 2 is a three-dimensional top view of the vehicle body structure according to the present disclosure.
Figure 3:
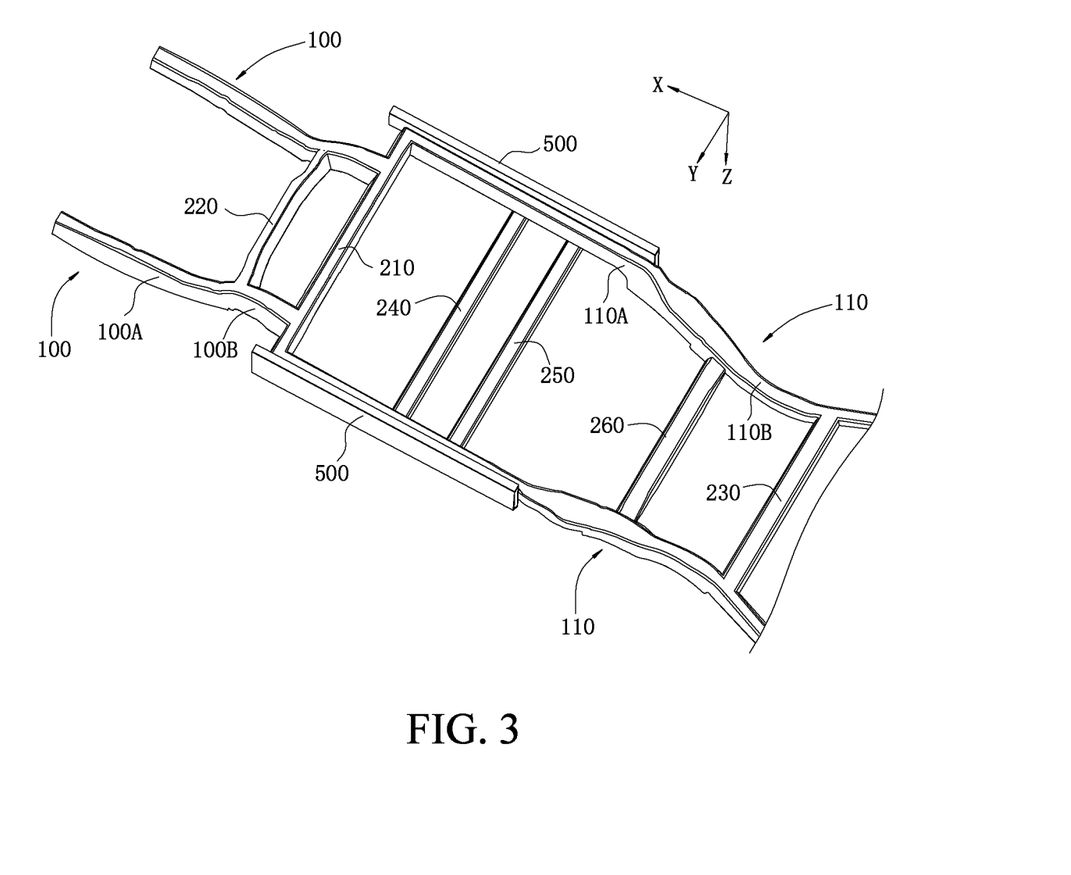
FIG. 3 is a three-dimensional bottom view of the vehicle body structure according to the present disclosure.

In an implementation, as shown in FIG. 2 and FIG. 4, the vehicle body structure may further include two strengthening longitudinal beams 130 disposed at intervals in the left-right direction, and strengthening crossbeams 240 and 250 disposed at intervals in the front-rear direction. Each of the strengthening longitudinal beams 130 may be integrally formed with a corresponding sill inner plate 500, to strengthen the sill inner plate 500. Each of the strengthening crossbeams may be integrally formed with the two strengthening longitudinal beams 130. The strengthening crossbeams 240 and 250 and the two strengthening longitudinal beams 130 encircle a square-shaped closed-loop frame, and the closed-loop frame is supported between the sill inner plates 500 on the left side and the right side. The strengthening crossbeams 240 and 250 may be located behind the front crossbeam 210 and located in front of the back seat mounting crossbeam 260.

In this case, when a side wall collision occurs to the vehicle, by forming the closed-loop frame between the two sill inner plates 500, on one hand, the flipping deformation of the sill inner plate 500 can be effectively reduced, so that the intruding deformation of a B-pillar (connected to the sill inner plate 500) in an in-vehicle direction is reduced, and possible damages to the passengers are decreased; and on the other hand, horizontal deformations of the floor panel 300 and the sill inner plate 500 are obviously reduced, the passengers are prevented from being hurt, and the battery pack disposed below the floor panel 300 is prevented from being damaged.

When a side pillar collision occurs to the vehicle, by using the closed-loop frame encircled by the strengthening crossbeams 240 and 250 and the two strengthening longitudinal beams 130, the strength of the vehicle body structure can be effectively improved, and the collision force can be directly transferred from the sill inner plate 500 on one side to the sill inner plate 500 on the other side, so that the horizontal deformations of the floor panel 300 and the sill inner plates 500 can be obviously reduced, the passengers are prevented from being hurt, and the battery pack disposed below the floor panel 300 is prevented from being damaged.

Especially, in the square-shaped closed-loop frame encircled by the strengthening crossbeams 240 and 250 and the two strengthening longitudinal beams 130, two ends of each strengthening longitudinal beam 130 are respectively supported by one strengthening crossbeam, so that the strengthening longitudinal beam 130 has very high strength and rigidity. When a side pillar collision occurs, the strengthening longitudinal beam 130 can more effectively transfer the collision force to the strengthening crossbeams 240 and 250.

In an implementation, the strengthening longitudinal beam 130 is disposed above the floor panel 300. In other implementations, the strengthening longitudinal beam 130 may alternatively be disposed below the floor panel 300.

The strengthening longitudinal beam 130 may be disposed at any proper longitudinal position of the sill inner plate 500. As shown in FIG. 2, for example, the strengthening longitudinal beam 130 may be disposed at a position generally corresponding to the B-pillar. Because the B-pillar is connected to the sill inner plate 500, by disposing the strengthening longitudinal beam 130 at the position generally corresponding to the B-pillar, a connected part of the sill inner plate 500 and the B-pillar can be pointedly strengthened, so that the intruding deformation of the B-pillar in an in-vehicle direction can be more effectively reduced.

Specifically, the rear end of the strengthening longitudinal beam 130 may correspond to the position of the B-pillar in the horizontal direction of the vehicle. For example, the length of the strengthening longitudinal beam 130 may be 300 to 500 mm. In some possible implementations, the front end of the strengthening longitudinal beam 130 may extend to a position corresponding to the A-pillar, and the rear end may extend to the back seat mounting crossbeam.

In an implementation, to improve the mounting strength of the front seats and ensure the safety of the front passengers, a front seat mounting point may be disposed on the strengthening crossbeams 240 and 250. That is, the strengthening crossbeams 240 and 250 may be respectively a front seat front mounting crossbeam and a front seat rear mounting crossbeam. Certainly, in other implementations, the front seat mounting point may be alternatively disposed in a region encircled by the strengthening crossbeams 240 and 250 and the two strengthening longitudinal beams 130.

When the strengthening longitudinal beam 130 is disposed below the floor panel 300, the strengthening crossbeams 240 and 250 may also be disposed below the floor panel 300 and are connected to the lower surface of the floor panel 300. In this case, if the strengthening crossbeams 240 and 250 are used as the front seat front mounting crossbeam and the front seat rear mounting crossbeam, holes may be opened at positions corresponding to the strengthening crossbeams of the floor panel 300, to facilitate the fastener to pass through the floor panel 300 to connect to the strengthening crossbeams.

Figure 1:
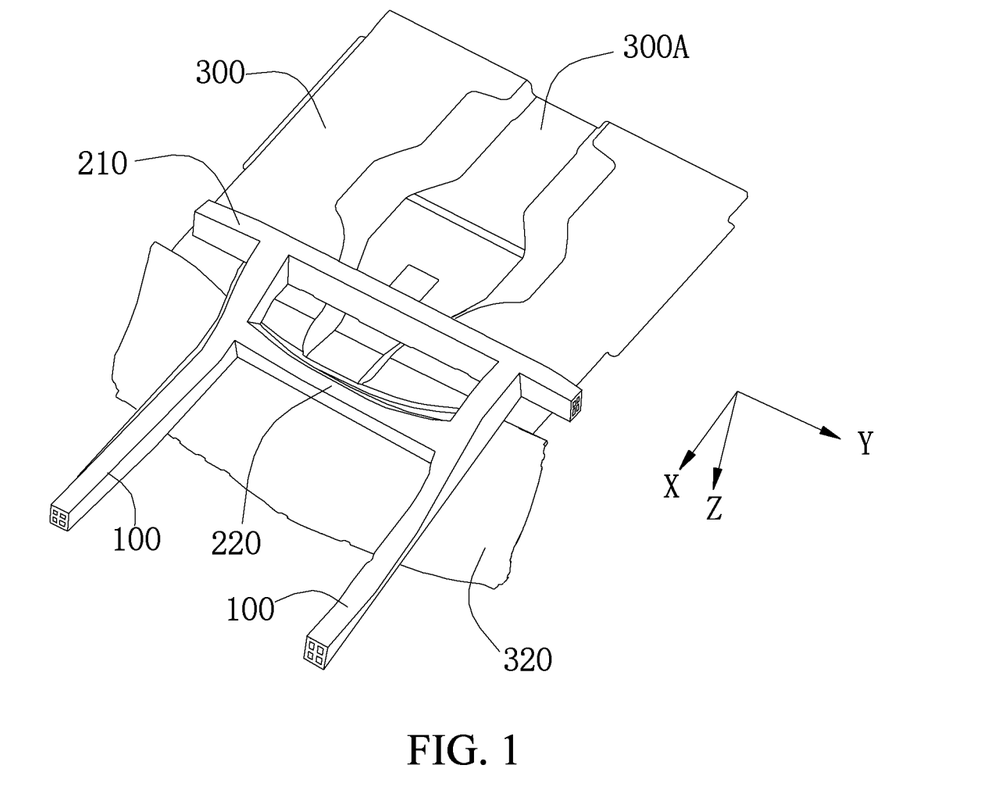
FIG. 1 is a three-dimensional bottom view of a partial structure of a vehicle body structure according to the present disclosure, where two front longitudinal beams, a forecabin crossbeam, a front crossbeam, a dash board, and a floor panel are shown.

As shown in FIG. 1, a central channel 300A protruding upward is formed on the floor panel 300. To facilitate to dispose the strengthening crossbeams 240 and 250 horizontally penetrating the floor panel 300, in the implementation, the central channel 300A may have a lower height than a common central channel. For example, the height of the central channel 300A may be less than 50 mm.

Regardless of whether the side collision is the side wall collision or the side pillar collision, the sill inner plate 500 suffers the collision impact and is slightly deformed to absorb the energy, and transfers the force to the vehicle body longitudinal beam 110 and the strengthening longitudinal beam 130. The force is transferred to the front part of the vehicle and the rear part of the vehicle, and the collision impact applied on one side may be transferred to the other side through the front crossbeam 210, the strengthening crossbeams 240 and 250, the rear-floor crossbeam 230, and the back seat mounting crossbeam 260 that horizontally striding across the vehicle, so that the collision forces on side surfaces are dispersed, to achieve the function of protecting the passenger compartment and the battery pack.

In an implementation of the vehicle body structure of the present disclosure, two closed-loop frames are formed below the floor panel 300, including:

One is a closed-loop frame encircled by the forecabin crossbeam 220, the two front longitudinal beams 100, and the front crossbeam 210. The closed-loop frame structure can first bear the front collision load, which includes the initial collision load transferred through the force transfer path and the backward collision impact driving the motor; second, the closed frame-shaped structure has relatively strong stability, and during actual production, it is ensured that the intruding deformation of the dash board in the front of the passenger compartment is restrained by setting proper thickness of the beam wall and proper strength of the materials; third, the frame-shaped structure and the strengthening structure formed by the outer connecting plate 420 disposed on the outer side of the front longitudinal beam 100 can effectively adapt to collision working conditions such as a severe retreat deformation trend of the wheel in a little offset collision, to ensure to restrain the deformation of the rear A-pillar and the sill inner plate 500; and fourth, the concentrated load applied by the front longitudinal beam and the wheel in the little offset collision can be dispersed and transferred to the sill inner plates 500 on two sides of the passenger compartment and the vehicle body longitudinal beam 110 to a maximum extent by using a stabilizing structure between the forecabin crossbeam 220 and the front crossbeam 210, to be further transferred to the rear part of the vehicle, to implement a normal stress and more effectively avoid the deformation of the passenger compartment in the front collision;

The other is a closed-loop frame formed by the bearing frame. The closed-loop frame at least has the advantages as follows: first, an arrangement area space of the storage batteries can be maximally provided under a condition that the deformation requirement for the collision safety is met, and the performance requirement of a long-distance endurance is improved; second, the closed-loop frame provides a simple and feasible assembly manner for the storage battery pack, and in the space arrangement aspect, the arrangement of the storage batteries with intensive features is beneficial to the electro-thermal management of the interior of the battery pack; third, a geometric position of the closed-loop frame and that of the passenger compartment are basically aligned with each other in an up-down position, so that the improvement on the anti-collision deformation of the frame structure or the passenger compartment structure can provide functions of protecting the passengers and the storage battery pack at the same time; fourth, the closed-loop frame can easily achieve a design with relatively good structure balance, to easily meet the requirement of performance balance of different parts. In conclusion, the two closed-loop frame structures can disperse the collision acting force into each beam, and further stop elements disposed in the front part of the vehicle, to prevent the power device of the vehicle such as a motor from moving backward due to the collision impact to intrude into the passenger compartment or squeeze the battery pack below the floor panel 300, which may cause a second collision damage;

In an implementation of the vehicle body structure of the present disclosure, a closed-loop frame structure is formed above the floor panel 300. That is, the square-shaped closed-loop frame encircled by the strengthening crossbeams 240 and 250 and the two strengthening longitudinal beams 130. The closed-loop frame not only can effectively improve the strength of the vehicle body structure, but also can directly transfer the collision force from the sill inner plate 500 on one side to the sill inner plate 500 on the other side, so that the horizontal deformations of the floor panel 300 and the sill inner plates 500 can be obviously reduced, the passengers are prevented from being hurt, and the battery pack disposed below the floor panel 300 is prevented from being damaged. Two ends of each strengthening longitudinal beam 130 is respectively supported by one strengthening crossbeam, so that the strengthening longitudinal beam 130 has relatively high strength and rigidity. When a side pillar collision occurs, the strengthening longitudinal beam 130 is not easily deformed, and therefore can more effectively transfer the collision force to the strengthening crossbeams 240 and 250.

The implementation of disposing two parallel strengthening crossbeams between the two strengthening longitudinal beams 130 is described above. In an alternative implementation, only one strengthening crossbeam or two crossed strengthening crossbeams may be disposed between the two strengthening longitudinal beams 130.

In the present disclosure, by making all or some of components (for example, each beam, inner connecting plate, outer connecting plate, or the like) of the vehicle body structure integrally formed, following effects may be achieved: first, deformation of the components caused by using welding, screw connection, riveting or the like is avoided, and dimensional precision of the component is improved; second, the connection strength between the components is increased, to ensure the connection reliability, which is more beneficial to the transfer and dispersion of the collision force; third, no specialized connecting structure (such as flanging) needs to be disposed at the connecting position of the components, which is beneficial to the lightweight of the vehicle; and fourth, making a plurality of components form an integral structure facilitates management.

In the present disclosure, all or some of the components of the vehicle body structure may be integrally formed by using any proper technology, such as aluminum casting, injection molding, or 3D printing.

Based on the foregoing technical solutions, the present disclosure further provides a vehicle. The vehicle includes the vehicle body structure provided in the present disclosure. Therefore, the vehicle has all advantages and beneficial effects of the vehicle body structure provided in the present disclosure. To reduce unnecessary repetition, details are not described herein again. Specifically, the vehicle may be an electric vehicle, so that the vehicle body structure adapts to the mounting of the battery pack.

In the descriptions of this specification, descriptions of reference terms such as "an embodiment", "some embodiments", "exemplary embodiment", "example", "specific example", or "some examples" are used to indicate that particular features, structures, materials, or characteristics described with reference to the embodiment or example are included in at least one embodiment or example of the present disclosure. In this specification, schematic descriptions of the foregoing terms do not necessarily refer to the same embodiment or example. Besides, the specific features, the structures, the materials or the characteristics that are described may be combined in a proper manner in any one or more embodiments or examples.

Although the embodiments of the present disclosure are shown and described above, a person of ordinary skill in the art can understand that changes, modifications, replacements, and variations can be made to the foregoing embodiments without departing from the principle and intention of the present disclosure, and the scope of the present disclosure is defined by the claims and equivalents thereof.

What is claimed is:

1. A vehicle body structure, comprising:
   a forecabin crossbeam; and
   two front longitudinal beams disposed at intervals along a left-right direction, wherein the forecabin crossbeam is integrally formed with the two front longitudinal beams and is at least partially located at a bottom of the front longitudinal beam.

2. The vehicle body structure according to claim 1, wherein the forecabin crossbeam is located in front of a dash board and is at least partially located behind a power device of a vehicle.

3. The vehicle body structure according to claim 1, wherein each of the front longitudinal beams comprises a main body segment and a downward bending segment connected to a rear end of the main body segment, and the forecabin crossbeam is connected between the downward bending segments of the two front longitudinal beams and is at least partially located below the main body segment.

4. The vehicle body structure according to claim 1, wherein each of the front longitudinal beams comprises a concave portion, and the forecabin crossbeam is connected to the concave portions of the two front longitudinal beams.

5. The vehicle body structure according to claim 1, wherein a distance by which orthographic projections of a front end and a rear end of each of the front longitudinal beams on a horizontal plane are staggered in a left-right direction is not greater than 80 mm.

6. The vehicle body structure according to claim 1, wherein the vehicle body structure comprises a bearing frame integrally formed, the bearing frame comprises a front crossbeam, a rear-floor crossbeam, and two vehicle body longitudinal beams, the front crossbeam and the rear-floor crossbeam are disposed at intervals along a front-rear direction, the two vehicle body longitudinal beams are disposed at intervals along a left-right direction, and the front longitudinal beam is integrally formed with the bearing frame.

7. The vehicle body structure according to claim 6, wherein rear ends of the front longitudinal beam extend to the front crossbeam, and the front longitudinal beam is integrally formed with the front crossbeam to be integrally formed with the bearing frame.

8. The vehicle body structure according to claim 6, wherein a rear end of the body longitudinal beam extends backward out of the rear-floor crossbeam.

9. The vehicle body structure according to claim 6, wherein the front crossbeam and the rear-floor crossbeam are located below a floor panel.

10. The vehicle body structure according to claim 6, further comprising:
two inner connecting plate disposed at intervals along a left-right direction, wherein the two inner connecting plates are disposed on inner sides of the two front longitudinal beams and are located between the front longitudinal beam and the front crossbeam, and the inner connecting plates are integrally formed with the front longitudinal beams, the forecabin crossbeam, and the front crossbeam.

11. The vehicle body structure according to claim 6, further comprising:
two outer connecting plates disposed at intervals along a left-right direction, wherein the two outer connecting plates are disposed on outer sides of the two front longitudinal beams, and the outer connecting plates are integrally formed with the front longitudinal beams, and the front crossbeam.

12. The vehicle body structure according to claim 6, wherein the vehicle body structure further comprises two sill inner plates located on left and right sides of the floor panel, and the sill inner plates are integrally formed with the front crossbeam, and the vehicle body longitudinal beams.

13. The vehicle body structure according to claim 12, wherein the sill inner plate extends forward out of the front crossbeam, and a distance between a front end of the sill inner plate and the front crossbeam in a front-rear direction is less than 1000 mm.

14. The vehicle body structure according to claim 12, wherein the vehicle body structure further comprises two strengthening longitudinal beams disposed at intervals along a left-right direction and at least one strengthening crossbeam, the strengthening crossbeam is integrally formed with the two strengthening longitudinal beams, and each of the strengthening longitudinal beams is integrally formed with the corresponding sill inner plate.

15. The vehicle body structure according to claim 14, wherein the strengthening crossbeam and the two strengthening longitudinal beams are located above the floor panel.

16. The vehicle body structure according to claim 14, wherein the at least one strengthening crossbeam comprises two strengthening crossbeams disposed at intervals along a front-rear direction and parallel to each other, and the two strengthening crossbeams and the two strengthening longitudinal beams form a closed-loop frame.

17. The vehicle body structure according to claim 14, wherein the strengthening crossbeam is a front seat mounting crossbeam.

18. The vehicle body structure according to claim 6, wherein the front crossbeam is a battery pack front mounting crossbeam, the rear-floor crossbeam is a battery pack rear mounting crossbeam, and the vehicle body longitudinal beam is a battery pack mounting longitudinal beam.

19. The vehicle body structure according to claim 6, wherein the vehicle body structure further comprises a back seat mounting crossbeam, the back seat mounting crossbeam is integrally formed with the body longitudinal beams, and the back seat mounting crossbeam is located in front of the rear-floor crossbeam at intervals.

20. A vehicle, comprising the vehicle body structure according to claim 1.

* * * * *